(12) United States Patent
Basak

(10) Patent No.: US 8,456,472 B2
(45) Date of Patent: Jun. 4, 2013

(54) RANKING NODES IN A GRAPH

(75) Inventor: Jayanta Basak, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 723 days.

(21) Appl. No.: 12/684,255

(22) Filed: Jan. 8, 2010

(65) Prior Publication Data

US 2011/0169833 A1      Jul. 14, 2011

(51) Int. Cl.
*G06T 11/20* (2006.01)

(52) U.S. Cl.
USPC ............... 345/440; 345/440.1; 345/440.2; 715/215

(58) Field of Classification Search
USPC ............... 345/440, 440.1, 440.2; 715/215
See application file for complete search history.

(56) References Cited

U.S. PATENT DOCUMENTS

| | | | |
|---|---|---|---|
| 6,272,507 B1 | 8/2001 | Pirolli et al. | |
| 6,509,898 B2 | 1/2003 | Chi et al. | |
| 6,738,678 B1 | 5/2004 | Bharat et al. | |
| 6,792,419 B1 | 9/2004 | Raghavan | |
| 7,076,483 B2 | 7/2006 | Preda et al. | |
| 7,281,002 B2 | 10/2007 | Farrell | |
| 7,779,001 B2 | 8/2010 | Zeng et al. | |
| 7,860,855 B2 * | 12/2010 | Hussami | 707/708 |
| 2003/0037074 A1 * | 2/2003 | Dwork et al. | 707/500 |
| 2005/0033742 A1 | 2/2005 | Kamvar et al. | |
| 2007/0203924 A1 * | 8/2007 | Guha et al. | 707/100 |
| 2008/0070209 A1 | 3/2008 | Zhuang et al. | |
| 2010/0010952 A1 * | 1/2010 | Kuhn et al. | 706/47 |
| 2010/0073374 A1 | 3/2010 | Gao et al. | |
| 2011/0173189 A1 | 7/2011 | Singh et al. | |

OTHER PUBLICATIONS

Huang et al. On Graph Modelling, Node Ranking and Visualization http://inderscience.metapress.com/app/home/contribution.asp?referrer=parent&backto=issue,2,11; journa1,9,15;linkingpublicationresults,1:113605,1.
Fruchterman et al. Graph Drawing by Force-directed Placement. Software—Practice and Experience, vol. 21(1 1), 1129-1164 (Nov. 1991).
Herman et al. Graph Visualization and Navigation in Information Visualization: A Survey. IEEE transactions on visualization and computer graphics, vol. 6, No. X, XXX, 2000.
PageRank. http://en.wikipedia.org/wiki/PageRank.
HITS. http://en.wikipedia.org/wiki/HITS_algorithm.
Agarwal et al. Learning Random Walks to Rank Nodes in Graphs.
Cohen, William. A Graph-Search Framework for Geneld Ranking.
Self-organizing Mapping (SOM). http://en.wikipedia.org/wiki/Self-organizing_map.

(Continued)

*Primary Examiner* — Xiao M. Wu
*Assistant Examiner* — Todd Buttram
(74) *Attorney, Agent, or Firm* — Ryan, Mason & Lewis, LLP

(57) ABSTRACT

A system and computer program product for ranking nodes in a graph include computing resultant path strength between each pair of nodes in a polynomial time, determining a first node based on resultant path strength such that total path strength to the first node is a maximum value, iteratively determining a next node from the first node to which the resultant path strength is a maximum value and the node is not visited, and providing each determined node a unique rank value, and ranking the nodes in an order determined by the unique rank value of each node.

19 Claims, 2 Drawing Sheets

OTHER PUBLICATIONS

Meiss et al., Ranking Web Sites with Real User Traffic, in Proceedings of the 2008 International Conference on Web Search and Data Mining (WSDM'08), 2008 ACM, New York, NY, USA, pp. 65-73.

Dwork et al., Rank Aggregation Methods for the Web, in Proceedings of the 10th International Conference on World Wide Web (WWW'01) 2001 ACM, New York, NY, USA, pp. 613-622.

* cited by examiner

RANKING NODES IN A GRAPH

FIELD OF THE INVENTION

Embodiments of the invention generally relate to information technology, and, more particularly, to web visualization.

BACKGROUND OF THE INVENTION

In topology preserving mapping, high-dimensional data is mapped onto a relatively low dimensional space such that the samples that are close to each other are mapped to nearby points and vice-versa. Topology preserving mapping can be used, for example, in visualization of the high-dimensional datasets. Also, in existing approaches, topology preserving mapping is usually performed in the Euclidian space or certain metric space. If the space is not Euclidian or a metric space, there is no such equivalent of topology preserving mapping. For example, in graphs, it may often be essential to know which nodes in the graph are very similar in nature and which are dissimilar.

SUMMARY OF THE INVENTION

Principles and embodiments of the invention provide techniques for ranking nodes in a graph. An exemplary method (which may be computer-implemented) for ranking nodes in a graph, according to one aspect of the invention, can include steps of computing resultant path strength between each pair of nodes in a polynomial time, determining a first node based on resultant path strength such that total path strength to the first node is a maximum value, iteratively determining a next node from the first node to which the resultant path strength is a maximum value and the node is not visited, and providing each determined node a unique rank value, and ranking the nodes in an order determined by the unique rank value of each node.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
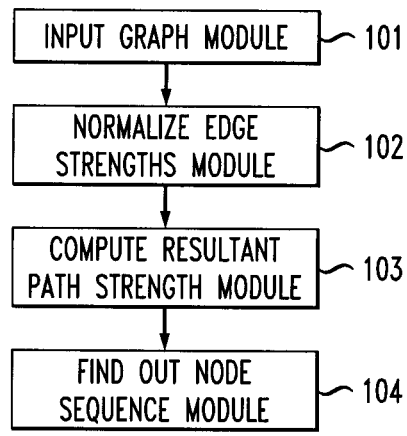
FIG. 1 is a block diagram illustrating an exemplary embodiment, according to an aspect of the invention.

Principles of the invention include techniques for viewing the nodes in a graph as a ranked list. One or more embodiments of the invention include mapping nodes in a graph into a ranked list such that similar nodes are mapped to nearby nodes in the list. The determination of similarity between two nodes in a graph can include, for example, whether the two nodes are connected to the same set of nodes, wherein the connectivity is the path connectivity. Two nodes can also be similar, by way of example, if they are directly connected through some edge of high edge strength.

In one or more embodiments of the invention, in a ranked list, the top node can correspond to the node which is strongly connected to a maximum number of nodes. Also, the last node can correspond to the node that is connected to least number of nodes in the graph. The neighboring nodes are connected to similar nodes in the graph (for example, through resultant path connectivity).

Additionally, one or more embodiments of the invention include displaying all of a group of web pages (for example, within a domain) in the form of a two-dimensional/three-dimensional (2D/3D) space where each webpage will be indicated as a point in the space. In one or more embodiments of the invention, the effective connectivity between two webpage will be reflected by their distance. As such, two very similar web pages (with a very high connectivity) will be placed very close to each other. Also, in one or more embodiments of the invention, the size of the point representing a webpage can reflect the number of times it has been clicked on over a certain period of time in the past by various other users.

This display can be shown whenever a user makes a search query. By way of example, along with the search results in the left panel, the display can be shown in a right panel with a different color of the points corresponding to the specific pages that have been listed in the left panel. Also, the points corresponding to the pages that have been browsed by the user in the same session can have different color(s). As such, a user can have an idea where in the web world (s)he is making search. Also, if (s)he wants to move into the web world, (s)he can interactively refine his/her search queries.

As described herein, one or more embodiments of the invention include obtaining an effective connectivity matrix W. As such, W is converted to a symmetric matrix such that $$\hat{W} = \frac{1}{2}(\hat{W} + \hat{W}^T).$$

Formally, if $\hat{W}_{ij}$ is the effective connectivity between i and j (two web pages i and j), then they are placed at a distance $d_{ij}$ such that $$E = K \sum_{i,j} (d_{ij} - \alpha_{ij})^2$$

is minimized where $d_{ij} = \|(x(i)-x(j)),(y(i)-y(j))\|$ is the distance between i and j in a 2D space (it can be extended to 3D if z is considered), K is a scaling constant, and $$\alpha_{ij} = \frac{\varepsilon_1}{\varepsilon_2 + \hat{W}_{ij}}$$

is a variable inversely proportional to the effective connectivity. $\varepsilon_1$ and $\varepsilon_2$ are constants which determine the upper bound on $\alpha$ when the effective connectivity is zero, and relative scaling between the pair-wise distances. Many other functions for $\alpha$ can also be chosen here. For example, a $\alpha = \varepsilon_1 \exp(-\varepsilon_2 W)$ is also a candidate function. Similarly, $$\alpha = \frac{\varepsilon_1}{\log(\varepsilon_2 + W)}$$

is also a candidate function.

Depending on the nature of the function, the nature of the display of the points may vary. The techniques detailed herein minimize the objective functional E with the constraints that (x,y) coordinate space for each point lies in the allocated space for display. Various techniques for optimizing the functional can be used such as, for example, iterative update, stochastic search techniques (such as simulated annealing, genetic algorithms, etc.).

By way of example, an iterative technique can be as follows. Let $p_i$ denote the position of the ith point (page) (in 2D it is a 2D vector, in 3D it is a 3D vector). Then one can iteratively update as $$\Delta p_i = -\eta \frac{\partial E}{\partial p_i},$$

where $\eta$ is an updating parameter. The update rule can be expressed as $\Delta p_i = -\eta[(p_i - \mu) - (\beta_i p_i - q_i)]$, where $\mu$ is the center of the points (centroid), $$\beta_i = \frac{1}{N} \sum_j \frac{\alpha_{ij}}{d_{ij}}$$

is a scalar, and $$q_i = \frac{1}{N} \sum_j \frac{\alpha_{ij} p_i}{d_{ij}}$$

is a vector.

Iterative update is one way of determining the positions of the points (pages) in the display. However, the objective functional E can be minimized by various other techniques such as stochastic gradient search (simulated annealing) and evolutionary algorithms. In one or more embodiments of the invention, the positions of the points can be updated once in a certain interval of time (for example, once a week) depending on how frequently the connectivity pattern changes. Because a stochastic search may sometimes become time-consuming and one need only to incrementally update the positions of the points once in a certain interval of time, an iterative approach (as described) can be more effective for this purpose.

Also, in a 2D display, the positions of the points can be directly displayed within an assigned area of display. If 3D coordinates are computed for the points, then certain projections on a 2D plane can be used for the display. The projection requires an additional matrix multiplication (computational time). However, a 3D coordinate system provides a flexibility of viewing the points from different angles by changing the projective transformation matrix. A 2D projection can serve the purpose of viewing.

As noted, the web can be visualized as a graph with connectivity patterns as the edges between the nodes. However, when the number of pages becomes very large, the connectivity pattern becomes very difficult to interpret (that is, to visualize the connectivity). As detailed herein, one or more embodiments of the invention include effectively displaying the world of a webpage where a user can visualize where he or she is browsing the web. In this display, there is no edge/line, and only the positions of the points indicate how close or how far the web-pages are. The web-page that he or she browsed, or the set of web-pages that are listed against his search query, can be shown in a different color in the 2D display. If he or she refines the query, then s/he moves to a different location on the display. As such, a user can feel how to move over the space of web-pages by refining his search queries interactively.

Additionally, one or more embodiments of the invention include ranking entities solely based on the connectivity pattern between the entities by computing the resultant path strength between every pair of nodes in a polynomial time. Also, as described herein, one or more embodiments of the invention include determining the first node in the list from the resultant path strength matrix such that total path strength to that node is a maximum value, as well as iteratively determining the next node of the list from the current node to which the resultant path strength is a maximum value and the node is not visited.

The visualization reveals how strongly two entities are related to each other. One or more embodiments of the invention also include techniques for visualizing search results in a meaningful presentation applicable, for example, to general problems of data mining, customer-targeted marketing, identifying potentially related products such as top similar products and most influential person in a social network.

The techniques described herein include determining a resultant connectivity matrix (two pages not connected by any link can be connected in the resultant connectivity), and coming up with a unique rank value for each page. A rank value corresponds to only one page, and two different pages will have different rank values. Also, one or more embodiments of the invention are completely unsupervised (that is, no relevance feedback is used). Moreover, as noted above, a unique rank value is assigned to every webpage.

One or more embodiments of the invention are not dependent on the usage pattern and also guarantee one unique rank value to every page so long as the graph structure does not change irrespective of the usage pattern. By way of example, if applied to social network, one or more embodiments of the invention not only provide a unique rank value to each agent, but also can bring similar agents close to each other (under certain assumption as stated in the post-disclosure material) even if they are not directly connected.

The techniques detailed herein also include sequencing nodes based on the resultant connectivity. In such a scenario, if two nodes are not related (through some connectivity), then there can be a chance that they can come in a sequence (next to each other) because the algorithm may not find any other strongly connected node (which is not visited, that is, all strongly connected nodes are exhausted). However, the resultant connectivity strength between such nodes will reveal how similar they are (in such a scenario they are weakly connected through the resultant connectivity). That is why in the context of transformation to a time-series, one should note the case of a domain.

Even if the domain notion is not there, the sequence can be segmented wherever its resultant connectivity strength falls below a certain threshold. Because the rank is being derived through the resultant connectivity between node pairs, one can note the notion of similarity. Similarity here can refer, for example, to the similarity with respect to resultant connectivity and not the exact content similarity. Also, independent of the query, one or more embodiments of the invention can assign a unique value to a node, and therefore, any browsing pattern can be transformed to a unique time-series.

As detailed herein, one or more embodiments of the invention include scaling a matrix such that every row-sum and column-sum are less than or equal to unity. As such, the value of a normalizing constant is automatically decided and does not need any extra user-defined parameter. By way of example, for web-pages, the connectivity can be scaled by the total number of out-bound links, but for real-valued edge-strengths, the normalization of every column-sum to unity does not reflect the extent of similarity. That is why the matrix is scaled and relative strengths remain the same.

In one or more embodiments of the invention, the resultant path connectivity matrix can be generated just by considering the row-sum, without a need to maintain any separate user-defined decaying factor d. Additionally, instead of considering simple row-sum, this can be combined with the content of web-pages to obtain a more meaningful rank $R=\hat{W}$, where c is vector representing the content importance of each page. Node ranking can have two different views: query-independent, query-dependent. A query-dependent view can be generated, for example, just by checking the strongest resultant connectivity to other nodes from the present node. As such, one or more embodiments of the invention include walking through the matrix $\hat{W}$ from the present node.

Further, in one or more embodiments of the invention, the notion of ranking can be based on similarity and one can also obtain a global such rank that is query-independent. Any browsing behavior through the nodes or pages can also be converted to a time-series.

As detailed herein, one or more embodiments of the invention include ranking entities based on connectivity pattern only, considering all possible paths between nodes, as well as determining a global ranking of the nodes in polynomial time. In order to determine the effective path strength between two nodes, all of the possible paths between two nodes are enumerated. As such, in order to find the mapping of the graph, all of the possible paths between every pair of nodes are determined.

By way of example, let two nodes i and j be directly connected by an edge of strength w(i,j). Let the two nodes be connected through another node k such that the edge strength from i to k is w(i,k) and that between k to j is w(k,j). In such a scenario, the resultant path strength is defined as w(i,j)+w (i,k)*w(k,j). Under this condition, it is possible to compute the resultant path strengths between every pair of nodes in polynomial time. Extending the logic of connectivity between two nodes, the resultant path strength can be expressed as $$w_{ij} = w_{ij} + \sum_k w_{ik} w_{kj} + \sum_{k,l} w_{ik} w_{kl} w_{lj} + \ldots$$

Let W be the connectivity matrix (edge strength matrix), then the resultant path strength $\hat{W}$ can be expressed as $\hat{W}=W+W*W+W*W*W+W*W*W*W+\ldots$ . If, for example, it is considered that every node is connected to itself, then the resultant path strength can be expressed as $\hat{W}=I+W+W*W+W*W*W+W*W*W*W+\ldots$ . Using the generalized Matrix Inversion Lemma, the resultant path strength can be expressed as $\hat{W}=(I-W)^{-1}$ under the condition $$0 \le \sum_j w_{ij} \le 1.$$

Also, one or more embodiments of the invention can, for example, start with the edge connectivity matrix W, determine $$\lambda = \frac{1}{\max\left\{\max_i\left\{\sum_j w_{ij}\right\}, \max_j\left\{\sum_i w_{ij}\right\}\right\}},$$

normalize $W \leftarrow \lambda*W$, compute $\hat{W}=(I-W)^{-1}$, and find the sequence of nodes $S=\{i_1, i_2, i_3, \ldots, i_n\}$ such that the $$\sum_p \hat{W}_{i_p i_{p+1}}$$

is maximized (a maximum value).

One or more embodiments of the invention also include considering the greedy approach, wherein the node i for which $$\sum_j \hat{w}_{ij}$$

is maximized is determined, and for every current node i, the non-visited node j such that $\hat{w}_{ij}$ is maximized is determined. The general NP-hard problem need not be solved because the nodes are ranked based on the resultant path connectivity. Such techniques, for example, can be used in batch mode.

The techniques detailed herein can also include customer segmentation using transaction data. By way of example, let the transaction data be represented by a C×P matrix T such that there are C customers and P products. Each entry T(i,j) represents the amount of product j (in certain units, for example, dollars) purchased by customer i over a certain period of time. A matrix can be constructed such that $$W = \begin{bmatrix} 0_{[C \times C]} & T \\ T' & 0_{[P \times P]} \end{bmatrix}$$

The matrix W has C+P nodes. Node sequencing techniques (such as, for example, those described herein) can be applied, and the resulting sequence represents a mixture of customers and products. The list customers isolated by a list of products represents a customer segment such that the customers in that segment have affinity to those products. The list can be used, for example, for targeting certain customers with certain specific products.

One or more embodiments of the invention can also include customer ranking using transaction data. Consider the matrix W=T*T'. Node sequencing techniques (such as, for example, those described herein) can be applied, and in the resulting list of customers, the customers placed on the top show high value customers who purchased a maximum number of products (or have maximum commonality with other customers). The customers placed at the bottom are those who purchased rarely or who have bought certain products not purchased by the majority.

Additionally, for product ranking using transaction data, consider the matrix W=T'*T. Node sequencing techniques (such as, for example, those described herein) can be applied, and in the resulting list of products, the products placed on the top show most common products purchased by a maximum number of customers or products which are bought with other products. The products placed at the bottom are bought rarely or bought in isolation.

Further, one or more embodiments of the invention can include customer attrition analysis using transaction data. In a supervised model, the customers can be sequences (for example, as described herein), and if some customers are known to have attrite (churned out) then the neighboring customers in the sequence can be investigated for possible cases of attrition. In an unsupervised model, the customer sequence is constructed over a period of time. As such, every customer can be given a rank in the list. The sequence of customers can be constructed over a sliding window (or non-overlapping window) of time (for example, first three months, next three months, etc.) with a certain window length. As such, different sequences over different periods of a time-frame can be obtained. If it is observed that a certain customer is going down in the list steadily over time, then there is a chance that the customer may churn out.

The techniques detailed herein can also include cross-sell/up-sell/bundling implementations. By way of example, a ranked list of products can be obtained. Two neighboring products in the list are most likely to be sold together. Also, the resultant path strength between the two products reveals how closely the two products are related, and the information can be used for cross-selling/up-selling/product bundling. One or more embodiments of the invention can provide a utility to the merchant in the form of a visualization capability augmented with certain measures of product relationship. A visualization capability can include, for example, an ability to see all of the products listed such that potentially related products are placed at neighboring locations. The visualization capability can be used to observe all pairs of potentially related products.

By way of example and not limitation, consider a merchant has a set of products. Consider also that the merchant has the transaction data (for example, one specific case) over the past several months (or, for example, a certain time period as chosen by the merchant). The merchant would like to offer certain products along with certain other products and s/he wants to first visualize which products to select for further analysis. The merchant can consider all products or s/he can select a product group. Also, the merchant has different utilities for visualization. For example, the merchant can select a product group (which may be all products) and ask to show a ranked list of products such that potentially similar products are placed at the neighboring locations (for example, an interactive scenario). In one or more embodiments of the invention, s/he can click any two products and see the quantitative strength of similarity. Additionally, the merchant can ask to show the top similar pairs of products (for example, a static scenario).

In the first case (that is, the interactive scenario), for example, the system calls this method to rank order the products, the matrix $\hat{W}$ is stored, and depending on which two products are selected, the corresponding entries in $\hat{W}$ are displayed. In the second case (that is, the static scenario), the system calls this method to obtain the matrix $\hat{W}$, and only a few top entries in the matrix $\hat{W}$ are displayed.

The techniques described herein can be used, for example, for user profiling. In web-based e-commerce sites, users can browse through several different web-pages. As such, it may be desirable to find similar users from their click-through pattern. In one or more embodiments of the invention, each web-page can be given a rank. Thus, any click-through pattern will convert to a time-series, where the value of the time-series at any point of time is the rank of the web-page corresponding to that instance. Also, the users can be grouped by clustering over this time-series.

In connection with click-through patterns, the web-pages can be connected by cross-referencing. Additionally, one or more embodiments of the invention include constructing a matrix W=B*B' and construct a sequence of Web-pages using this technique. Every web-page can be assigned a numerical value depending on its rank. Also, as noted above, the click-through pattern of a user can be converted to a discrete time-series, and the users can be grouped by clustering over the time-series.

In one or more embodiments of the invention, the same concept can be extended to transaction data (with customer identification) where products can be ranked and each customer is assigned a vector depending on the ordinal ranking of the products that they purchased. The customers can be grouped based on these vectors. Such customer grouping using transaction data and product ranking allows comparing purchase of two different products. In one or more embodiments of the invention, if two customers buy two products that are very similar, then they can be assigned to the same group although a simple distance measure in the transaction data does not encode this information.

The techniques described herein can also be used, by way of example, for designing an online recommender system from browsing patterns. Because a ranking over all nodes (possibly, for example, within a domain) based on similarity is generated, one or more embodiments of the invention can be used as an online recommendation engine. As such, a user browses through the pages of his/her interests. This can be transformed into a time-series (where each page has a value).

In such a scenario, it is possible to predict the future value which transforms into a page in that domain. This can be extended to a set of pages in the neighborhood of that page. In one or more embodiments of the invention, because the rank value computation of all pages can be done off-line, they can be stored separately and therefore the time-series transformation and vice-versa can be a hashing function. As such, in the search space, along with the results, whenever a user clicks through several pages, the corresponding recommendation can appear as a separate column (for example, on the right side of a screen). Also, these recommendations are not static and depend on the user behavior.

With the computation of the future value of the time-series, because this is short-term prediction, an autoregressive (AR) model can be used. The time-series prediction model can be refined by taking into account the browsing behavior of various users in the past (in addition to the present browsing behavior). In this context, the time-series prediction component that can be leveraged is absent in any existing online recommendation engines. Additionally, designing a recommender system is applicable to many domains and not necessarily only the e-commerce domain.

One or more embodiments of the invention can additionally include document ranking, where each document is represented by a vector of words, and the documents are sequenced using the techniques detailed herein in the same way as performed in customer ranking using transaction data. Such techniques can also reveal the similarity between documents. Also, one or more embodiments of the invention can be used within a social networking. The connectivity pattern between the agents forms a graph, and the agents can be sequenced using the techniques detailed herein. By way of example, the top ranked agents are highly connected to others whereas bottom ranked agents are more isolated.

FIG. 1 is a block diagram illustrating an exemplary embodiment, according to an aspect of the invention. By way of illustration, FIG. 1 depicts an input graph module 101, a normalize edge strengths module 102, a compute resultant path strength module 103 and a find out node sequence module 104. An input graph module 101 can include, for example, a set of nodes and a set of edges, as well as a connectivity matrix W. A normalize edge strengths module 102 can include normalizing W, wherein $$W \leftarrow \lambda * W \text{ and } \lambda = \frac{1}{\max\left\{\max_i\left\{\sum_j w_{ij}\right\}, \max_j\left\{\sum_i w_{ij}\right\}\right\}}.$$

A compute resultant path strength module 103 can include computing a resultant path strength $\hat{W}=(I-W)^{-1}$, wherein I is an identity mark. Also, a find out node sequence module 104 can include a node sequence l, and starting with $l(1)=1$ and a current node in a sequence $l(i)=j$, and module 104 finds the next node $l(i+1)=k$ such that $k \notin l$ $\hat{w}_{j,k} \geq \hat{w}_{jm}$ for all $m \neq k$ and $m \notin l$ (k not visited).

Figure 2:
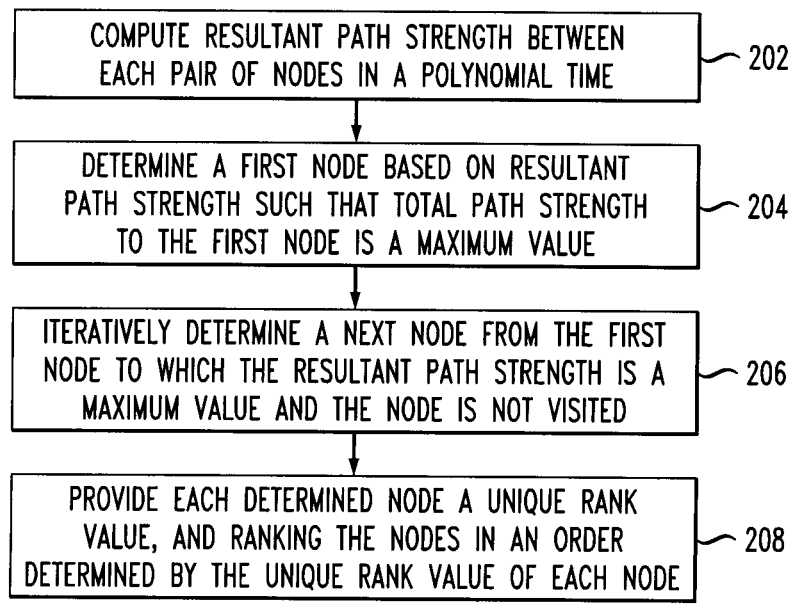
FIG. 2 is a flow diagram illustrating techniques for ranking nodes in a graph, according to an embodiment of the invention.

FIG. 2 is a flow diagram illustrating techniques for ranking nodes in a graph (for example, directed, undirected, etc.), according to an embodiment of the present invention. Step 202 includes computing resultant path strength between each pair of nodes in a polynomial time. As detailed herein, the resultant path strength is the sum total of strengths of all possible paths between two nodes. In one or more embodiments of the invention, by way of example, each node can represent a webpage. Step 204 includes determining a first node based on resultant path strength such that total path strength to the first node is a maximum value.

Step 206 includes iteratively determining a next node from the first node to which the resultant path strength is a maximum value and the node is not visited. By way of example, the aspect of "visited" is described in connection with the find out node sequence module 104 of FIG. 1. Step 208 includes providing each determined node a unique rank value, and ranking the nodes in an order determined by the unique rank value of each node. Providing each determined node a unique rank value can include providing each determined node a unique rank value based on a user query as well as providing a global rank that is query-independent.

The techniques depicted in FIG. 2 can also include viewing the nodes in a graph as a ranked list. In the ranked list, a top node can correspond to a node that is strongly connected to a maximum number of nodes in the graph. Also, for example, a last node can correspond to a node that is connected to a least number of nodes in the graph.

One or more embodiments of the invention can additionally include displaying each webpage of a group of web pages in a space wherein each webpage is indicated as a point in the space. The effective connectivity between two web pages can be reflected by the distance between the two points representing the two web pages. Also, the size of the point representing a webpage can reflect the number of times it has been clicked on over a period of time by one or more users. Further, in one or more embodiments of the invention, the position of a point is updated once in a certain interval of time (for example, depending on how frequently the connectivity pattern changes).

Additionally, as described herein, in one or more embodiments of the invention ranking nodes in an undirected graph can be used within the context of, for example, user profiling, document ranking, social networking, customer segmentation using transaction data, customer ranking using transaction data, customer attrition analysis using transaction data, and/or designing an online recommender system from browsing patterns.

The techniques depicted in FIG. 2 can also, as described herein, include providing a system, wherein the system includes distinct software modules, each of the distinct software modules being embodied on a tangible computer-readable recordable storage medium. The distinct software modules can include, for example, an input graph module, a normalize edge strengths module, a compute resultant path strength module and a find out node sequence module executing on a hardware processor.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 3:
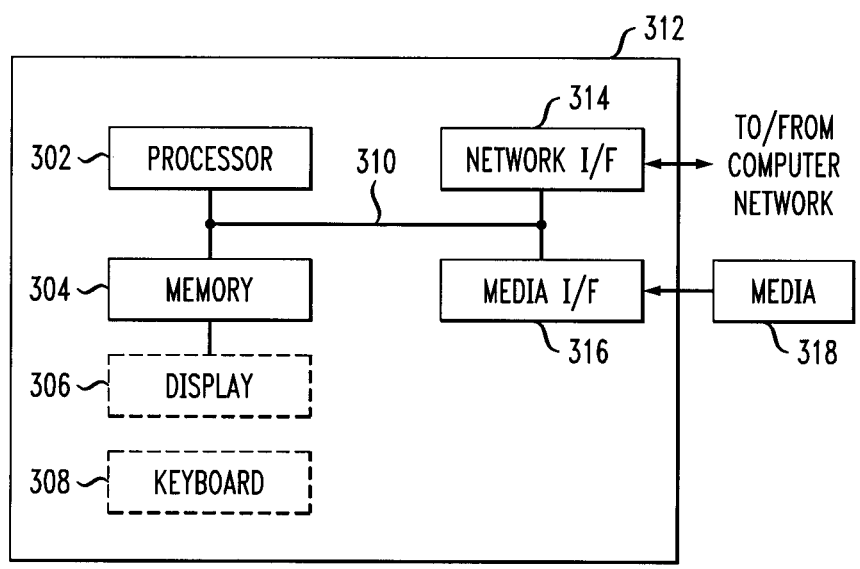
FIG. 3 is a system diagram of an exemplary computer system on which at least one embodiment of the invention can be implemented.

One or more embodiments can make use of software running on a general purpose computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor.

The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 318 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction implementation system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction implementation system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 1. The method steps can then be carried out using the distinct software modules and/or sub-modules of the system, as described above, executing on one or more hardware processors 302. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, generating a resultant connectivity matrix (two pages not connected by any link can be connected in the resultant connectivity), as well as generating a unique rank value for each page.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A computer program product comprising a tangible computer readable recordable storage medium including computer useable program code for ranking nodes in a graph, the computer program product including:

computer useable program code for computing resultant path strength between each pair of nodes in a polynomial time;

computer useable program code for determining a first node based on resultant path strength such that total path strength to the first node is a maximum value, wherein the resultant path strength is the sum total of strengths of all possible paths in the graph between two nodes, and wherein the first node is the node that is connected to a maximum number of nodes in the graph, said determining comprising:

determining a sequence (S) of nodes (i), $S=\{i_1, i_2, i_3, \ldots, i_n\}$, such that $$\sum_p \hat{W}_{i_p i_{p+1}}$$

is a maximum value, wherein $\hat{W}$ is a matrix representing connectivity between nodes in the graph, and p represents node position in the graph;

computer useable program code for iteratively determining a next node from the first node to which the resultant path strength is a maximum value and the node is not visited, said iteratively determining being carried out until completion of the path; and computer useable program code for providing each determined node a unique rank value, and ranking the nodes in an order determined by the unique rank value of each node.

2. The computer program product of claim 1, wherein the computer useable program code for providing each determined node a unique rank value comprises computer useable program code for providing each determined node a unique rank value based on a user query.

3. The computer program product of claim 1, further comprising computer useable program code for viewing the nodes in a graph as a ranked list.

4. The computer program product of claim 3, wherein in the ranked list, a top node corresponds to a node that is strongly connected to a maximum number of nodes in the graph.

5. The computer program product of claim 3, wherein in the ranked list, a last node corresponds to a node that is connected to a least number of nodes in the graph.

6. The computer program product of claim 1, wherein the computer useable program code comprises one or more distinct software modules, and wherein the one or more distinct software modules comprise an input graph module, a normalize edge strengths module, a compute resultant path strength module and a find out node sequence module executing on a hardware processor.

7. The computer program product of claim 1, wherein each node represents a webpage.

8. The computer program product of claim 7, further comprising computer useable program code for displaying each webpage of a group of web pages in a space wherein each webpage is indicated as a point in the space.

9. The computer program product of claim 7, wherein an effective connectivity between two web pages is reflected by a distance between the two points representing the two web pages.

10. The computer program product of claim 7, wherein a size of the point representing a webpage reflects a number of times it has been clicked on over a period of time by one or more users.

11. The computer program product of claim 7, wherein a position of a point is updated once in a certain interval of time.

12. A system for ranking nodes in a graph, comprising:
a memory; and
at least one processor coupled to the memory and operative to:
compute resultant path strength between each pair of nodes in a polynomial time;
determine a first node based on resultant path strength such that total path strength to the first node is a maximum value, wherein the resultant path strength is the sum total of strengths of all possible paths in the graph between two nodes, and wherein the first node is the node that is connected to a maximum number of nodes in the graph, said determining comprising:
determining a sequence (S) of nodes (i), $S=\{i_1, i_2, i_3, \ldots, i_n\}$, such that $$\sum_p \hat{W}_{i_p i_{p+1}}$$

is a maximum value, wherein $\hat{W}$ is a matrix representing connectivity between nodes in the graph, and p represents node position in the graph;
iteratively determine a next node from the first node to which the resultant path strength is a maximum value and the node is not visited, said iteratively determining being carried out until completion of the path; and
provide each determined node a unique rank value, and ranking the nodes in an order determined by the unique rank value of each node.

13. The system of claim 12, wherein the at least one processor coupled to the memory operative to provide each determined node a unique rank value is further operative to provide each determined node a unique rank value based on a user query.

14. The system of claim 12, further comprising a tangible computer-readable recordable storage medium having one or more distinct software modules embodied thereon, wherein the one or more distinct software modules comprise an input graph module, a normalize edge strengths module, a compute resultant path strength module and a find out node sequence module module executing on a hardware processor.

15. The system of claim 12, wherein each node represents a webpage.

16. The system of claim 15, wherein the at least one processor coupled to the memory is further operative to display each webpage of a group of web pages in a space wherein each webpage is indicated as a point in the space.

17. The system of claim 15, wherein an effective connectivity between two web pages is reflected by a distance between the two points representing the two web pages.

18. The system of claim 15, wherein a size of the point representing a webpage reflects a number of times it has been clicked on over a period of time by one or more users.

19. The system of claim 15, wherein a position of a point is updated once in a certain interval of time.

* * * * *